United States Patent [19]

Wiemer et al.

[11] 4,246,786
[45] Jan. 27, 1981

[54] FAST RESPONSE TEMPERATURE SENSOR AND METHOD OF MAKING

[75] Inventors: Klaus C. Wiemer, Richardson, Tex.; Joseph D. Lejeune, Spartanburg, S.C.

[73] Assignee: Texas Instruments Incorporated, Dallas, Tex.

[21] Appl. No.: 48,122

[22] Filed: Jun. 13, 1979

[51] Int. Cl.³ .............................................. G01K 7/22
[52] U.S. Cl. ................................. 73/362 AR; 29/612; 338/22 R
[58] Field of Search ..................... 73/362 AR, 362 SC; 338/22 SD, 22 R; 29/612

[56] References Cited

U.S. PATENT DOCUMENTS

| 2,938,385 | 5/1960 | Mack et al. ..................... | 73/362 AR |
| 3,147,457 | 9/1964 | Gill et al. ........................ | 73/362 AR |
| 3,936,789 | 2/1976 | Matzen ............................ | 338/22 SD |
| 4,142,170 | 2/1979 | Blatter ............................ | 73/362 AR |

OTHER PUBLICATIONS

"Planar Semiconductor Temperature Sensors etc." Wiemer et al, The Automotive Application of Sensors, Society of Automotive Engineers, Inc., Warrendale, Pa., 1977.

Primary Examiner—Donald O. Woodiel
Attorney, Agent, or Firm—James P. McAndrews; John A. Haug; Melvin Sharp

[57] ABSTRACT

A fast response temperature sensing device particularly adapted for use in a rarefied fluid media comprises a body of semiconducting material having a precisely predetermined positive temperature coefficient of resistivity in a selected temperature range. The body has ohmic contact element secured thereto to form a small spreading resistance type of resistor element having precisely predetermined resistance characteristics. Leads are electrically connected to the element for connecting the element in an electrical circuit. The element is encapsulated for shielding the element from the environment in a temperature zone to be monitored; and a vane having greater thermal conductivity than the encapsulating material and having greater heat capacity than the resistor element are secured in heat-transfer relation to the element to extend outside the encapsulating material for rapidly conducting heat to the resistor element from the temperature zone. The temperature sensing device is made by providing a lead frame having leads and a vane, by mounting the resistor element in heat-transfer relation to the vane and in electrically connected relation to the leads, and encapsulating the element and portions of the leads and vane so that the leads extend outside the encapsulating material to be connected in a circuit and the vane extends outside the encapsulating material to receive and conduct heat to the resistor element.

13 Claims, 11 Drawing Figures

FAST RESPONSE TEMPERATURE SENSOR AND METHOD OF MAKING

There are many well known temperature sensing systems which are in wide use today for a variety of control purposes. Such systems include thermocouples, active semiconductor devices, thermistors of negative temperature coefficient of resistivity, metal wire resistors of positive temperature coefficient of resistivity, ceramic resistors of more sharply positive temperature coefficient of resistivity, and bimetal discs and the like. Although such systems are now widely used, all of the systems are subject to one deficiency or another so that, for each potential temperature sensing requirement being considered, most of the commonly used systems are either too slow or unreliable or too expensive to be commercially practical. That is, the capabilities of the sensing systems have to be very carefully matched to the control requirements to meet the needs of each specific control application and even then some undesirable compromises usually have to be made. In this situation, a need is now growing for increasingly faster and more precise temperature sensing systems which must be available at low cost for use in a number of new control applications of wide commercial and social significance. For example there is now a need for fast, precise, rugged and low cost temperature sensors for use in engine manifolds and the like to optimize automotive engine performance under continuously varying environmental and operating conditions. It is believed that the known temperature sensing systems noted above will be inadequate for meeting the response time, precision, reliability and cost needs and the like of such new control applications.

More recently, new spreading resistance types of resistor elements have been developed utilizing silicon semiconducting materials or the like which have desirable, positive temperature coefficients of resistivity in selected temperature ranges. Such spreading resistors are adapted to be provided with precisely predetermined resistance characteristics at low cost and, when used for temperature sensing purposes, are adapted to provide output signals of substantial linearity to be compatible with microcomputer automotive control systems and the like. Such resistor elements have been proposed for use for temperature sensing purposes in some of the new types of control applications as noted above. However, when such resistor elements have been proposed for use in sensing temperature changes in an air-fuel mixture in an automotive engine manifold or in other rarefied media or the like, the resistor elements have not previously been adapted to be mounted in such environments while also achieving sufficiently fast response time and the like for meeting the needs of the new control applications.

It is an object of this invention to provide novel and improved temperature sensing means; to provide such temperature sensing means which display very fast response to changes in temperature even in rarefied media such as air-fuel mixtures in automotive engines and the like; to provide such sensing means which are precise, rugged and reliable for use in such automotive environments; and to provide such sensing means which are inexpensive to manufacture, are compatible for use with microcomputer control systems and the like, and are adapted to be conveniently and inexpensively mounted in a zone whose temperature is to be monitored. It is also an object of this invention to provide a novel and improved method for making such temperature sensing means.

Briefly described, the novel and improved temperature sensing means of this invention comprises a body of resistance material having a resistivity which varies with change in temperature. Lead means are connected to the body for connecting the body in an electrical circuit. Organic dielectric means of relatively low thermal conductivity encapsulate the body for shielding the body from the environment in a zone whose temperature is to be monitored. Vane means of metal or the like having relatively greater thermal conductivity than the encapsulating means are secured in heat-transfer relation to the body of resistance material to extend outside the encapsulating means for receiving and rapidly conducting heat to the body from the temperature zone.

In preferred embodiments of the invention, the resistance material comprises a generally planar body of crystalline semiconducting material having a selected dopant or impurity concentration for providing the material with a precisely predetermined positive temperature coefficient of resistivity in a selected temperature range. A pair of ohmic contacts are secured to the opposite sides of the body to form a small spreading resistance type of resistor element having precisely predetermined resistance characteristics. Lead frame means provide a pair of leads and a thermally-conducting vane. The resistor element is secured in efficient heat-transfer relation to the vane and the leads are then electrically connected to the respective ohmic contacts. Organic dielectric means are then used to encapsulate the resistor element and portions of the leads and vane so that the leads extend from the encapsulating means for connecting the resistor element in an electrical circuit and so that the vane extends outside the encapsulating means to conduct heat to the resistor element. The spreading resistor element is provided with a selected, small heat capacity relative to the heat capacity of the vane and the vane preferably has a large surface to volume ratio so that the vane is adapted to rapidly change temperature in response to temperature change in the zone being monitored even if there is a rarefied media or the like in the zone and so that the resistor element is adapted to change its temperature substantially simultaneously with change in temperature of the vane means.

In that way, the novel and improved temperature sensing means of this invention is adapted to be used in various environments in a temperature zone being monitored but is adapted to provide very fast response to change in temperature in the zone.

Other objects, advantages and details of the novel and improved temperature sensing means and method of this invention appear in the following detailed description of preferred embodiments of the invention, the detailed description referring to the drawings in which.

Figure 1:
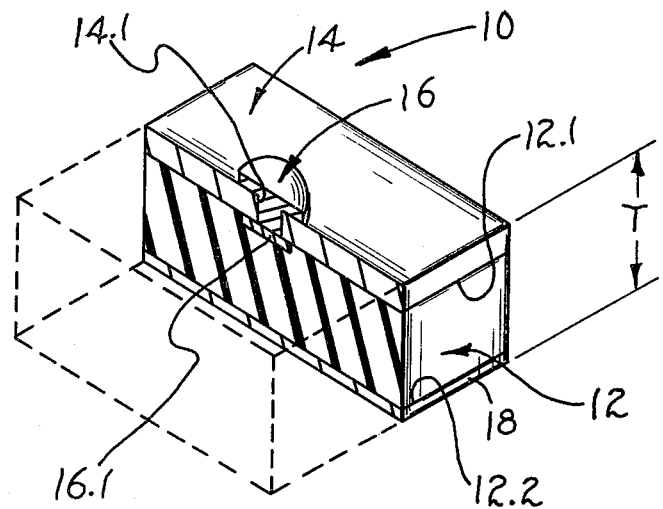
FIG. 1 is a perspective view to large scale of a spreading resistance type of resistor element used in the temperature sensing means of this invention.

Referring to the drawings, 10 in FIG. 1 indicates a spreading resistance type of resistor element which is shown to include a body 12 of a crystalline semiconducting material such as silicon or the like having a selected dopant or impurity density therein for providing the semiconducting material with a desired, positive temperature coefficient of resistivity in a selected temperature range. The body has a generally planar configuration as shown having relatively broad, flat opposite sides 12.1 and 12.2 and having a controlled thickness T which is provided in any conventional manner. One side 12.1 of the semiconductor body is substantially covered with an oxide coating 14 and a central opening 14.1 is provided in the coating in a very accurate manner by conventional photo-lithographic techniques or the like. Electrically conductive contact coatings 16 and 18 are then deposited on the opposite sides of the body 12 in ohmic contact relation to the material of the body in any conventional manner. If desired, the dopant or impurity concentration is increased in the area 16.1 by conventional diffusion techniques or the like prior to deposition of the contact 16 for improving the ohmic contact made to the resistor body material by the contact means 16.

Such spreading resistance types of resistor elements utilizing semiconducting materials of positive temperature coefficient of resistivity are conventional and are well known and are described in U.S. Pat. No. 3,936,789 and in "Planar Semiconductor Temperature Sensors etc.", Wiemer et al., *The Automotive Applications of Sensors*, Society of Automotive Engineers, Inc., Warrendale, Pa., 1977. Accordingly the spreading resistor elements are not further described herein and it will be understood that, in such resistor elements, the semiconducting body material is provided with desired resistance properties with a high degree of uniformity by well known, economical semiconducting manufacturing techniques. Further, in the spreading resistance configuration, the diameter of the contact 16 is the primary dimensional feature determining the resistance properties of the element and that diameter is adapted to be easily and economically controlled by well known manufacturing techniques as noted above. Accordingly, the resistor element 10 is adapted to be manufactured at very low cost and to display very precisely predetermined resistance properties.

Figure 8:
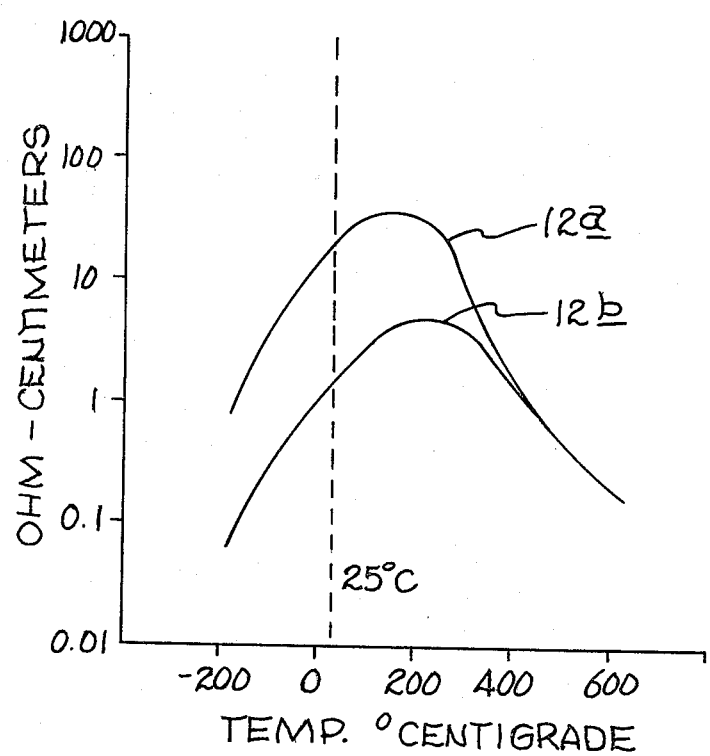
FIGS. 8-10 are graphs illustrating characteristics of the temperature sensing means provided by this invention.
Figure 9:
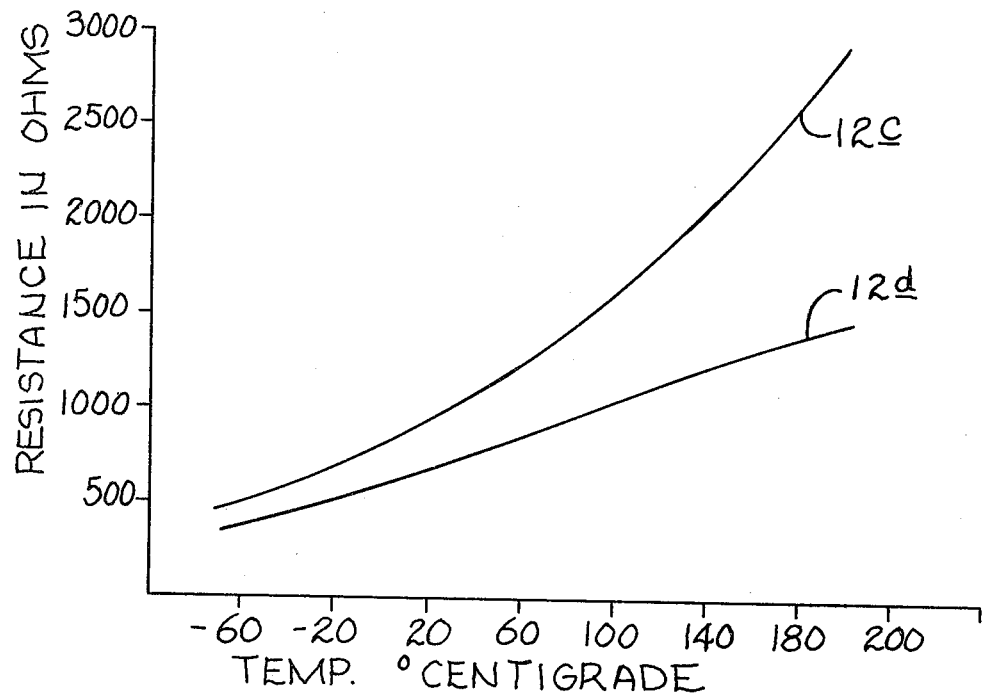

In this regard, the spreading resistance elements 10 as used herein are preferably formed of silicon materials having dopant or impurity densities or concentrations in the range from about $5 \times 10^{14}/cm.^3$ to $5 \times 10^{15}/cm.^3$. Such semiconductor materials display room temperature resistivities in the range from about 10 to 1 ohm-centimeters and as is illustrated by curves 12a and 12b in FIG. 8 respectively are adapted to display generally linear, positive temperature coefficients of resistivity in the temperature range from −55° C. to 125° C. Typically also the resistor element 10 as utilized herein has a length and width of about 0.015 inches, a thickness T of about 0.007 inches, and a contact 16 of a diameter of about 0.001 inches. Where the resistor body material has a room temperature resistivity of about 5.6 ohm-centimeters, the resistor element has a nominal resistance value of about 1000 ohms at room temperature. With those dimensions, the resistor element 10 also has a very small heat capacity as will be understood. If desired, the temperature-resistance characteristics of the element 10 as indicated by curve 12c in FIG. 9 may be made linear as indicated by curve 12d in FIG. 9 where a conventional resistor (not shown) is secured in shunt relation to the resistor 10 in any conventional manner.

Figure 2:
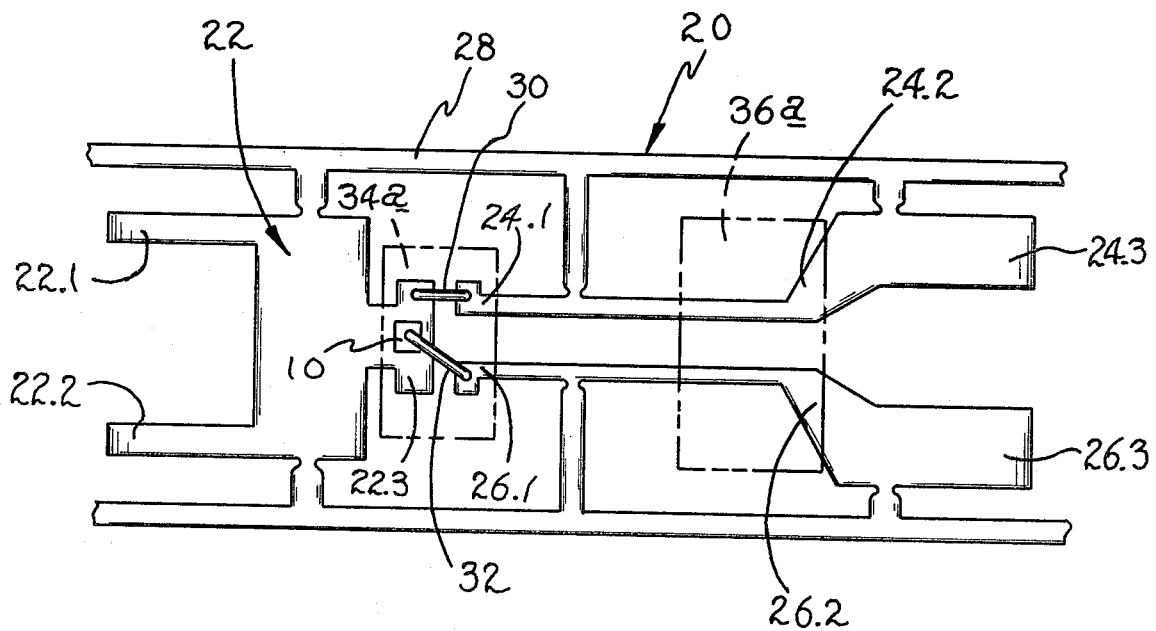
FIG. 2 is partial plan view diagrammatically illustrating a step in the method of this invention.

In a preferred embodiment of this invention, lead frame means 20 are provided in a conventional continuous strip configuration as is illustrated in FIG. 2 but in accordance with the method of this invention, each unit of the lead frame means includes a thermally-conducting vane means 22, a pair of leads 24, 26, and skeleton means 28 for temporarily holding the vanes and leads in the configuration shown in FIG. 2. The lead frame means 20 is preferably formed of a metal material such as copper, or copper clad stainless steel or the like of relatively high thermal conductivity and preferably has a thickness in the range from about 0.0025 to 0.0050 inches or the like.

Preferably as shown in FIG. 2, the vane means has end extensions 22.1 and 22.2 for a purpose to be described below and also includes a pad portion as illustrated at 22.3 in FIG. 2. Typically, the vane means has a width of about 0.150 inches and an overall length on the order of about 0.235 inches so that the vane means has a surface to volume ratio of at least about 25 to 1 $in^2/in.^3$ or more.

Preferably also, the leads 24 and 26 have first ends 24.1, 26.1 adjacent the vane pad which are of relatively small cross sectional size as shown in FIG. 2. The leads also have additional portions 24.2, 26.2 where the leads widen to provide relatively greater cross sectional size extending out to the opposite ends 24.3, 26.3 of the leads.

In a preferred embodiment of this invention, the resistor element 10 is secured in efficient heat-transfer relation to the vane means 22, and the leads 24, 26 are electrically connected to the element for connecting the element in an electrical circuit. Preferably for example, the ohmic contact 18 of the resistor is soldered or otherwise secured in electrically and thermally conducting relation to the pad of the vane 22 by the use of a gold eutectic or the like. Fine gold wires 30, 32 or the like bonded to the lead ends 24.1, 26.1 are respectively connected to the vane 22 and to the ohmic contact 16 of the resistor element. Where the spreading resistor 10 and the vane means 22 have proportions as illustrated in FIG. 2 and as described above it will be appreciated that the vane means has a heat capacity which greatly exceeds the heat capacity of the resistor element. In this regard, it should also be noted that although the element 10 is shown to comprise a spreading resistor element embodying a crystalline semiconducting material, the resistor could be formed of any body of resistance material which vaires in resistivity with change in temperature within the scope of this invention.

Figure 3:
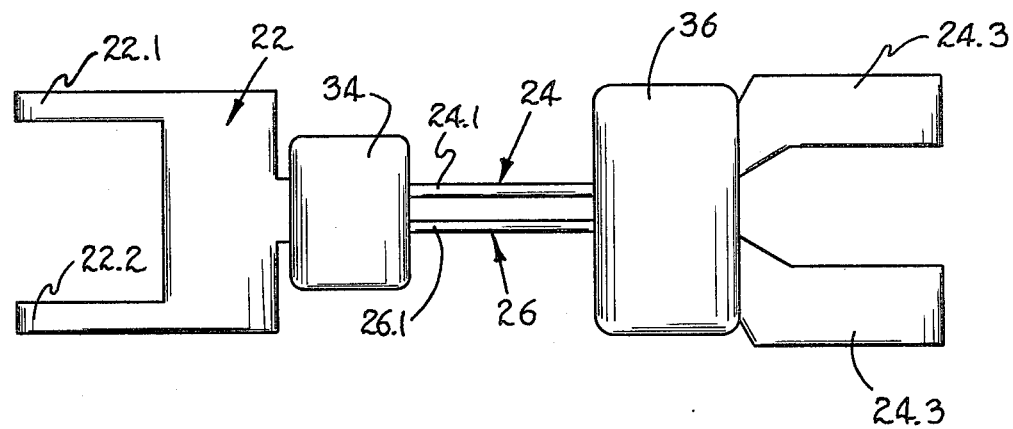
FIG. 3 is a plan view similar to FIG. 2 illustrating the novel temperature sensing means provided by this invention.
Figure 4:
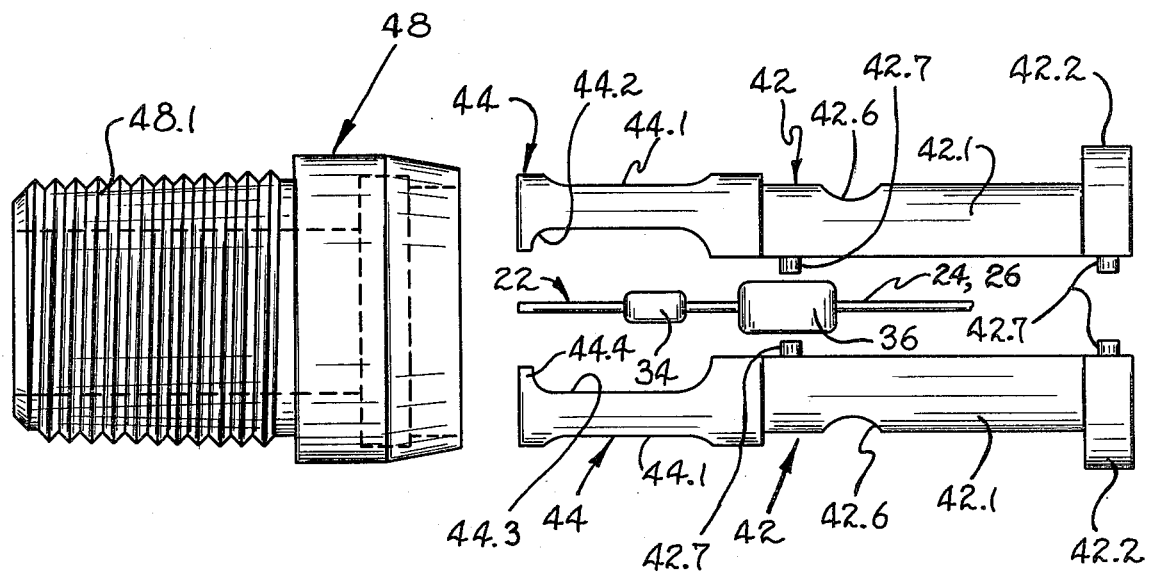
FIG. 4 is an exploded side elevation view of mounting means used with the sensing means shown in FIG. 3.

In a preferred embodiment, a first encapsulation 34 of glass filled nylon or other organic, dielectric material or the like of relatively low thermal conductivity is formed in sealing relation around the resistor element 10, around a portion of the vane 22, and around the first lead ends 24.1, 26.1 as is indicated at 34a in FIG. 2. In addition, a second encapsulation 36 of the same or similar material is formed around the additional portions 24.2, 26.2 of the leads (where the leads widen to their relatively larger cross section) in spaced relation to the first encapsulation 34. The second encapsulation is indicated by broken lines 36a in FIG. 2. The skeleton 28 is then cut from the lead frame means 20 in any conventional manner for forming the novel and improved temperature sensing means 38 as shown in FIG. 3.

In that arrangement, the first encapsulation 34 shields the resistor element from its surrounding environment so that the sensing means 38 is adapted for use in various automotive applications. The first encapsulation also holds the leads 24, 26 in predetermined position relative to the resistor 10. The vane 22 is secured in efficient heat-transfer relation to the resistor and the vane extends out of the first encapsulation for receiving and conducting heat to the resistor from the surrounding environment. As the vane is formed of a material of relatively much greater thermal conductivity than the encapsulating means and has a very high surface volume ratio, the vane is adapted to change temperature rapidly in response to change in temperature of the surrounding environment. In addition, because the resistor element 10 is very small and has a heat capacity which is much smaller than that of the vane, the resistor element is adapted to change its temperature substantially simultaneously in response to change in temperature of the vane means.

In the preferred embodiment of this invention, the temperature sensing means 38 is combined with mounting means of special configuration to form the novel and improved temperature sensing apparatus 40 as shown in FIGS. 4-7.

The mounting means includes a plurality of housing sections which are secured together around the sensing means 38 for holding the sensing means therebetween. Preferably, for example, the mounting means includes a pair of substantially identical housing sections 42 each of which is molded of a glass filled nylon or other material of relatively low thermal conductivity and each of which is a generally semicylindrical shape. Each section has a main portion 42.1 with an outer boss 42.2 at one end. The inner semicylindrical diameter of the main portion also has one part 42.3 or relatively large diameter, another part 42.4 of relatively small diameter to fit snugly around the second encapsulation 36 of the sensing means, and a third part 42.5 which is preferably just large enough to pass the leads 24, 26 where the leads extend between the two encapsulations of the sensing means. Preferably the main housing portion 42.1 has apertures 42.6 opening into the large diameter part 42.3 of the housing section and the housing section preferably have pins 42.7 and recesses 42.8 molded therein which are adapted to interfit with corresponding recesses and pins in the other housing section.

In preferred embodiments of the invention, the housing sections also have extensions thereof 44 at one end of the sections. The extensions are also generally of a semicylindrical shape but are substantially cut away at 44.1, 44.2 and 44.3. The extensions also preferably have tip portions 44.4 at the distal ends of the extensions as shown in FIGS. 6 and 7.

Figure 5:
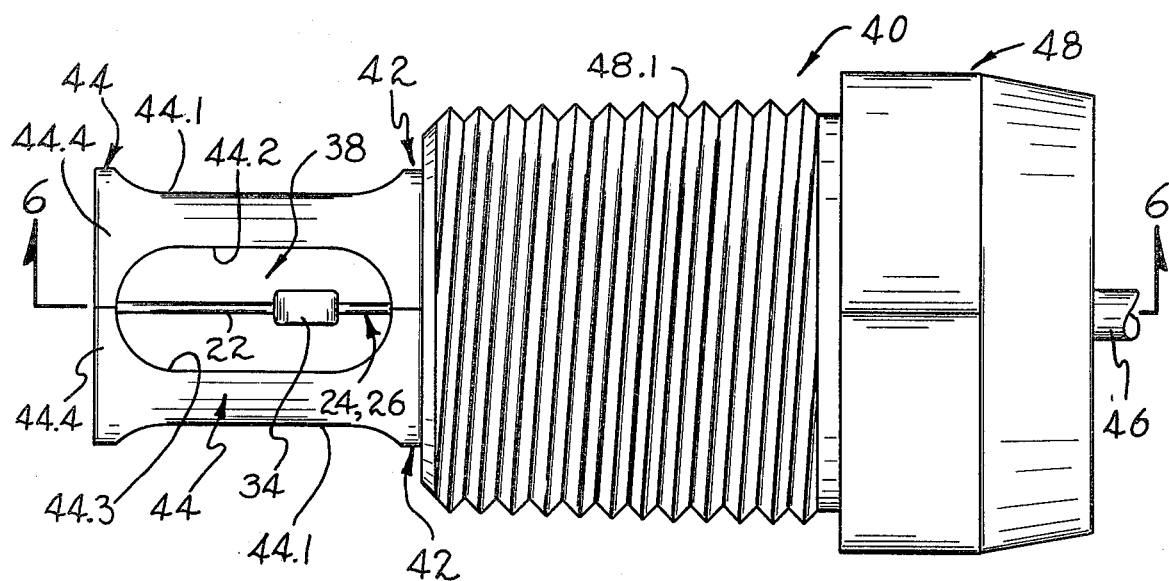
FIG. 5 is side elevation view to enlarged scale of the assembled mounting means shown in FIG. 4.
Figure 6:
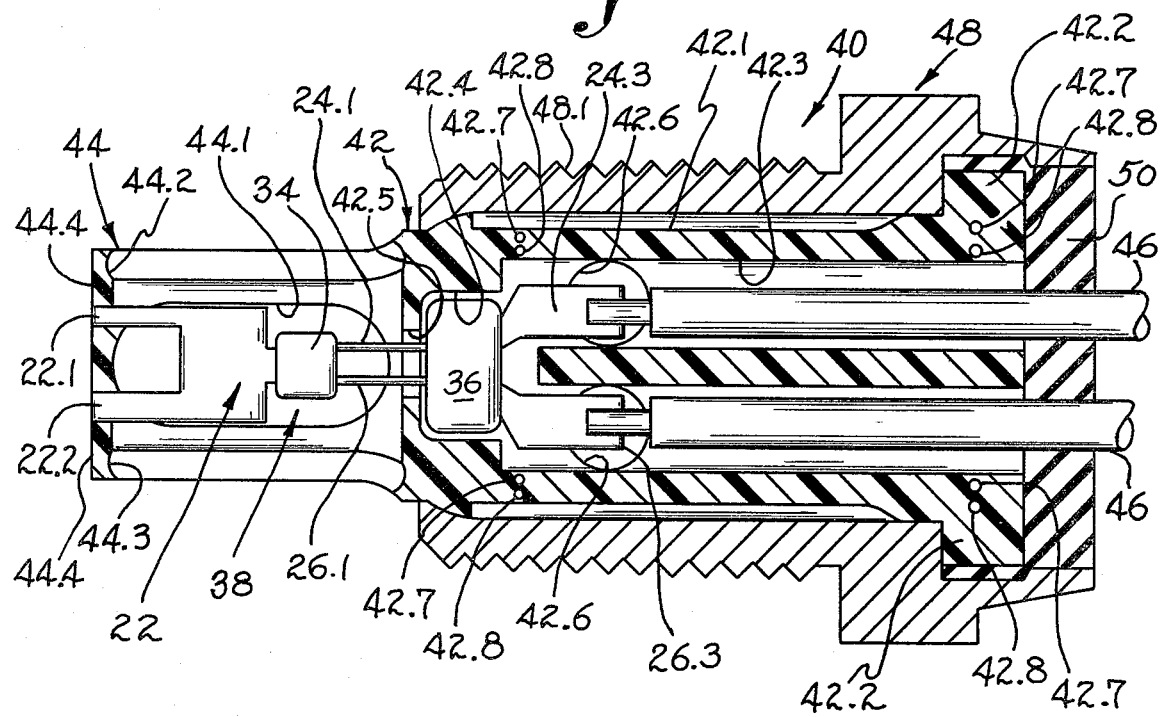
FIG. 6 is a section view along line 6—6 of FIG. 5.
Figure 7:
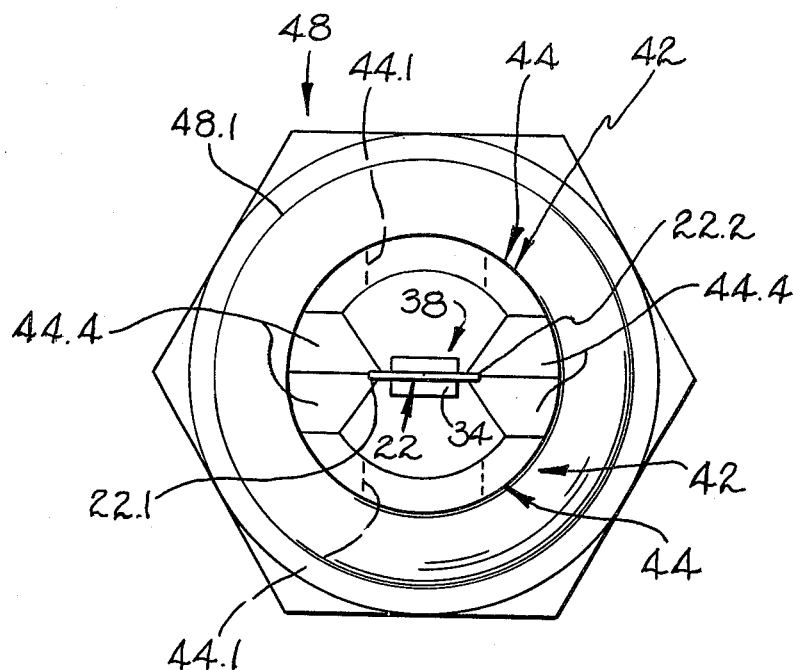
FIG. 7 is an end elevation view of the device shown in FIG. 5.

The housing sections 42 are then secured together around the temperature sensing means 38 for holding the sensing means therebetween while exposing the vane 22 to the environment between the housing extensions 44 as is best shown in FIGS. 5-7. That is, the semicylindrical housing sections are abutted to interfit pins 42.7 and recesses 42.8 so that the sections engage the second encapsulation 36 to hold the sensing means 38 between the sections, so that the large lead ends 24.3, 26.3 extend into the large diameter parts 42.3 of the housing sections, and so that the extending ends 22.1, 22.2 of the vane are gripped and held between the tips 44.4 of the housing extensions.

In that structure, the large lead ends 24.3, 26.3 are positioned to be conveniently welded through the apertures 42.6 to lead wires 46 for connecting the sensing means 38 in an electrical circuit. Preferably a metal bushing 48 of brass or the like is fitted over the housing sections at one end thereof and is secured to the housing sections with an epoxy cement 50 or in other conventional manner so that the vane 22 extends from one end of the bushing and the lead wires 46 extend from the opposite end of the bushing. Preferably the bushing has external screw threads 48.1 or other mounting means thereon for use in mounting the apparatus 40 in a zone whose temperature is to be monitored.

In that construction of the apparatus 40, the bushing 48 permits convenient mounting of the apparatus 40 in automotive applications and the like so that the vane 22 is exposed to a rarefied media in a temperature zone to be monitored and so that the lead wires 46 are conveniently connected in a circuit outside of the zone. The housing extensions 44 are disposed in spaced surrounding relation to the vane 22 to shield the vane from physical blows during handling, mounting and use of the apparatus but also expose the vane to free flow of a rarefied media around the vane. The vane is thus exposed to be rapidly responsive to temperature change in the zone. The tips of the housing sections hold the vane so that it does not vibrate excessively. The first lead ends 24.1, 26.1 are of small cross section so that the leads do not tend to withdraw very much heat from the resistor element 10 within the sensing means and in any event the first lead ends are exposed to substantially the same temperature conditions as the vane 22. Accordingly, the sensing means 38 properly responds to the temperature changes in a temperature zone being monitored. On the other hand, the second encapsulation of the sensing means is engaged by the housing sections 42 and therefore provides substantial strain relief between the lead wires 46 and the small lead ends 24.1, 26.1. Accordingly the apparatus 40 is adapted to display very fast and very reliable response to temperature changes in a temperature zone even though there is only a rarefied media in the zone.

Figure 10:
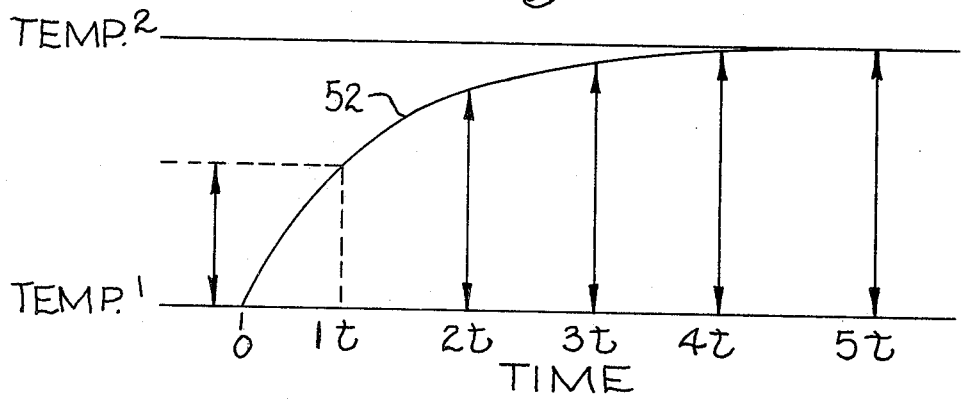
Figure 11:
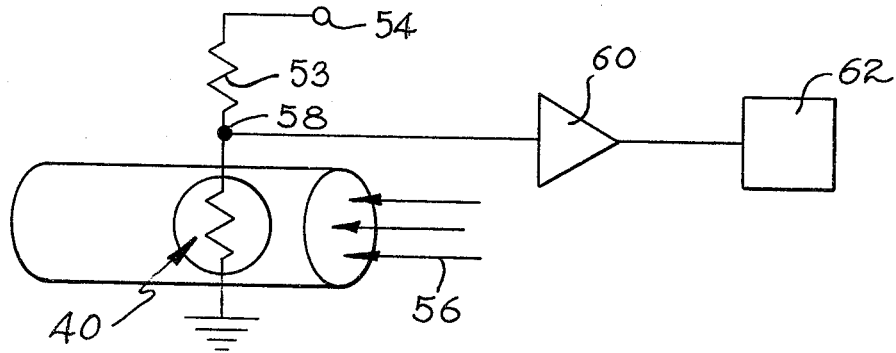
FIG. 11 is a schematic view illustrating use or application of the temperature sensing means of this invention.

Thus, as is indicated by curve 52 in FIG. 10, where the temperature in the zone is abruptly changed from Temperature 1 to Temperature 2, the signal output from the apparatus is adapted to reflect 62.3 percent of that temperature change within one time period "$1t$" as indicated in FIG. 10 and is adapted to fully reflect that temperature change in five times that period "$5t$" as shown in curve 10. In this regard, the apparatus 40 is adapted to display time constants "t" on the order of 1-2 seconds even in rarefied media such as air moving at a rate of about 1500 feet/min. That is, when the sensor apparatus 40 is connected in series with a limiting resistor 53 between a reference voltage 54 and ground as shown in FIG. 11 and is exposed to a flow of air or air-fuel mixture or other fluid or the like as indicated at 56 in FIG. 3, the resistance of the resistor element 10 in the apparatus 40 rapidly changes with changes in the temperature of the fluid. The voltage of 58 is furnished to a conventional analog to digital converter 60 and to a microprocessor 62 which uses the digitized signal to determine the temperature of the fluid 56. Utilizing the sensing apparatus 40, the microprocessor is adapted to determine the fluid temperature with significantly improved speed and accuracy as noted above.

It should be understood that although preferred embodiments of the invention have been described by way of illustrating the invention, the invention includes all modifications and equivalents thereof falling within the scope of the appended claims.

We claim:

1. Temperature sensing means comprising a body of electrical resistance material having a resistivity which varies with change in temperature, lead means electrically connected to the body for connecting the body in an electrical circuit, means encapsulating the body and portions of the lead means for shielding the body from an environment in a zone whose temperature is to be monitored and for permitting the lead means to extend from the encapsulating means to be connected in an electrical circuit, and additional means having relatively greater thermal conductivity than the encapsulating means secured in heat-transfer relation to the body of resistance material to extend outside the encapsulating means for receiving and rapidly conducting heat to the body of resistance material from the zone to be monitored.

2. Temperature sensing means comprising a body of electrical resistance material having a resistivity which varies with change in temperature, lead means electrically connected to the body for connecting the body in an electrical circuit, means encapsulating the body for shielding the body from an environment in a zone whose temperature is to be monitored, and means having relatively greater thermal conductivity than the encapsulating means secured in heat-transfer relation to the body of resistance material to extend outside the encapsulating means for receiving and rapidly conducting heat to the body of resistance material from the zone to be monitored, the body of resistance material having a heat capacity which is small relative to the heat capacity of said thermally conducting means so that change in temperature of the body of resistance material in response to change in temperature in the zone to be monitored occurs substantially simultaneously with change in temperature of the thermally conducting means in response to said zone temperature change.

3. Temperature sensing means as set forth in claim 2 wherein said thermally conducting means comprises vane means having a surface to volume ratio of at least about 25 to 1 in$^2$./in$^3$.

4. A fast response temperature sensing device particularly adopted for use in a rarefied media comprising a body of electrical resistance material having a resistivity which varies with change in temperature, ohmic contact means secured to said body to form a spreading resistance type of resistor element having precisely predetermined resistance, lead means electrically connected to the ohmic contact means for connecting the resistor element in an electrical circuit, means encapsulating the body for shielding the body of resistance material from an environment in a zone whose temperature is to be monitored, and means having relatively greater thermal conductivity than the encapsulating means secured in heat-transfer relation to the resistor element to extend outside the encapsulating means for receiving and rapidly conducting heat to the body of resistance material from the temperature zone to be monitored, said spreading resistor element having a heat capacity which is small relative to the heat capacity of said thermally conducting means so that change in temperature of the body of resistance material in response to change in temperature in the zone to be monitored occurs substantially simultaneously with the change in temperature of said thermally conducting means in response to said zone temperature change.

5. A temperature sensing device as set forth in claim 4 wherein said resistance material comprises a crystalline semiconducting material having a selected dopant concentration therein providing such material with a precisely predetermined positive temperature coefficient of resistivity in a selected temperature range.

6. A temperature sensing device as set forth in claim 5 wherein said semiconducting material comprises silicon having an impurity dopant concentration in the range from about $5 \times 10^{14}$ parts per cubic centimeter to about $5 \times 10^{15}$ parts per cubic centimeter.

7. A fast response temperature sensing device particularly adapted for use in a rarefied media comprising a generally planar body of crystalline semiconducting material having a pair of relatively broad flat opposite sides, said material having a selected dopant concentration therein providing the material with a precisely predetermined positive temperature coefficient of resistivity in a selected temperature range, a pair of ohmic contact means secured to the respective opposite sides of the body to form a spreading resistance type of resistor element having precisely predetermined resistance properties, metal lead frame means having a pair of leads electrically connected to the respective ohmic contact means for connecting the resistor element in an electrical circuit, and dielectric means encapsulating the body for shielding the body from an environment in a zone whose temperature is to be monitored, said lead frame means having vane means of relatively greater thermal conductivity than the encapsulating means secured in heat-transfer relation to the resistor element to extend outside the encapsulating means for receiving and rapidly conducting heat to the body material from the temperature zone to be monitored, said spreading resistor element having a selected heat capacity which is small relative to the heat capacity of said vane means so that change in temperature of the body in response to change in temperature in the zone to be monitored occurs substantially simultaneously with change in temperature of the vane means in response to said zone temperature change.

8. A temperature sensing device as set forth in claim 7 wherein one of said ohmic contact means is secured in electrically-conductive heat-transfer relation to the lead frame vane means, and wherein a pair of wires bonded to the other ohmic contact means and to the vane means respectively are electrically connected to said respective leads for connecting the resistor element in an electrical circuit while restricting heat-transfer between the element and said leads.

9. A temperature sensing device as set forth in claim 7 having additional resistor means of selected properties connected in parallel with said spreading resistor element to provide the device with selected linear variation in resistance over said selected temperature range.

10. A method for making temperature sensing means comprising the steps of providing thermally-conductive means, securing a body of electrical resistance material having a resistivity which varies with change in temperature in heat-transfer relation to the thermally-conducting means, connecting lead means to the body for electrically connecting the body in an electrical circuit, and encapsulating the body in encapsulating means to shield the body from an environment in a zone whose temperature is to be monitored, said thermally-conducting means having relatively greater thermal conductivity than said encapsulating means, and said body being encapsulated so that the thermally-conducting means extends outside the encapsulating means for receiving and rapidly conducting heat to the body of resistance material from the zone to be monitored.

11. A method for making a fast response temperature sensing device which is particularly adapted for use in a rarefied media composing the steps of providing thermally-conducting vane means having a selected heat capacity and a relatively large surface-to-volume ratio of at least about 25 to 1 $in^2./in^3$, providing a body of electrical resistance material having a resistivity which varies with change in temperature with ohmic contact means to form a spreading resistor type of resistor element of precisely predetermined resistance having a relatively smaller heat capacity than the vane means and securing the resistor element in heat-transfer relation to the vane means so that change in temperature of the element in response to change in temperature in a zone whose temperature is to be monitored occurs substantially simultaneously with change in temperature of the vane means in response to said zone temperature change, connecting lead means to the element for electrically connecting the element in an electrical circuit, and encapsulating the element in encapsulating means to shield the element from an environment in the zone to be monitored, said vane means having relatively greater thermal conductivity than the encapsulating means, and said element being encapsulated so that the vane means extend outside the encapsulating means for receiving and rapidly conducting heat to the element from the temperature zone to be monitored.

12. A method for making a fast response temperature sensing device which is particularly adopted for use in a rarefied media comprising the steps of providing lead frame means having a pair of leads and thermally-conducting vane means having a selected heat capacity and a relatively large surface-to-volume ratio of at least about 25 to 1 $in^2./in^3.$, providing a body of selectively doped, crystalline semiconducting material of predetermined positive temperature coefficient of resistivity in a selected temperature range with a pair of ohmic contact means to form a spreading resistor type of resistor element of precisely predetermined resistance having a relatively much smaller heat capacity than the vane means and securing the resistor element in heat-transfer relation to the vane means so that change in temperature of the element in response to change in temperature in a zone whose temperature is to be monitored occurs substantially simultaneously with change in temperature of the vane means in response to said zone temperature change, electrically connecting said lead means to said respective ohmic contact means for electrically connecting the element in an electrical circuit, and encapsulating the element in encapsulating means to shield the element from an environment in the zone to be monitored, said vane means having relatively greater thermal conductivity than the encapsulating means, and said element being encapsulated so that the vane means extend outside the encapsulating means for receiving and conducting heat to the element from the temperature zone to be monitored.

13. A method as set forth in claim 12 wherein one of said ohmic contact means is secured to said vane means for connecting the resistor element in electrically and thermally conducting relation to the vane means, and wherein a pair of wires bonded to the vane means and to the other ohmic contact means respectively are electrically connected to the respective lead means for electrically connecting the element in an electrical circuit while restricting heat-transfer between the element and said lead means.

* * * * *